No. 732,779. PATENTED JULY 7, 1903.
F. B. POPE.
APPARATUS FOR SEPARATING KERNELS FROM HULLS OF SEEDS.
APPLICATION FILED APR. 18, 1901.
NO MODEL. 2 SHEETS—SHEET 1.

No. 732,779. PATENTED JULY 7, 1903.
F. B. POPE.
APPARATUS FOR SEPARATING KERNELS FROM HULLS OF SEEDS.
APPLICATION FILED APR. 18, 1901.
NO MODEL. 2 SHEETS—SHEET 2.

No. 732,779. Patented July 7, 1903.

UNITED STATES PATENT OFFICE.

FREDERICK B. POPE, OF AUGUSTA, GEORGIA.

APPARATUS FOR SEPARATING KERNELS FROM HULLS OF SEEDS.

SPECIFICATION forming part of Letters Patent No. 732,779, dated July 7, 1903.

Application filed April 18, 1901. Serial No. 56,435. (No model.)

*To all whom it may concern:*

Be it known that I, FREDERICK B. POPE, a citizen of the United States, residing at Augusta, in the county of Richmond and State of Georgia, have invented certain new and useful Improvements in Apparatus for Separating Kernels from Hulls of Seeds, of which the following is a specification.

My invention relates to apparatus for separating the kernels from the hulls of cotton and other seeds; and it consists of a sifter and a screener and certain conductors and in the construction of parts whereby the kernels may be separated from the hulls and each conducted to a grinding or comminuting apparatus of any suitable character, as fully set forth hereinafter and as illustrated in the accompanying drawings, in which—

Figure 1:
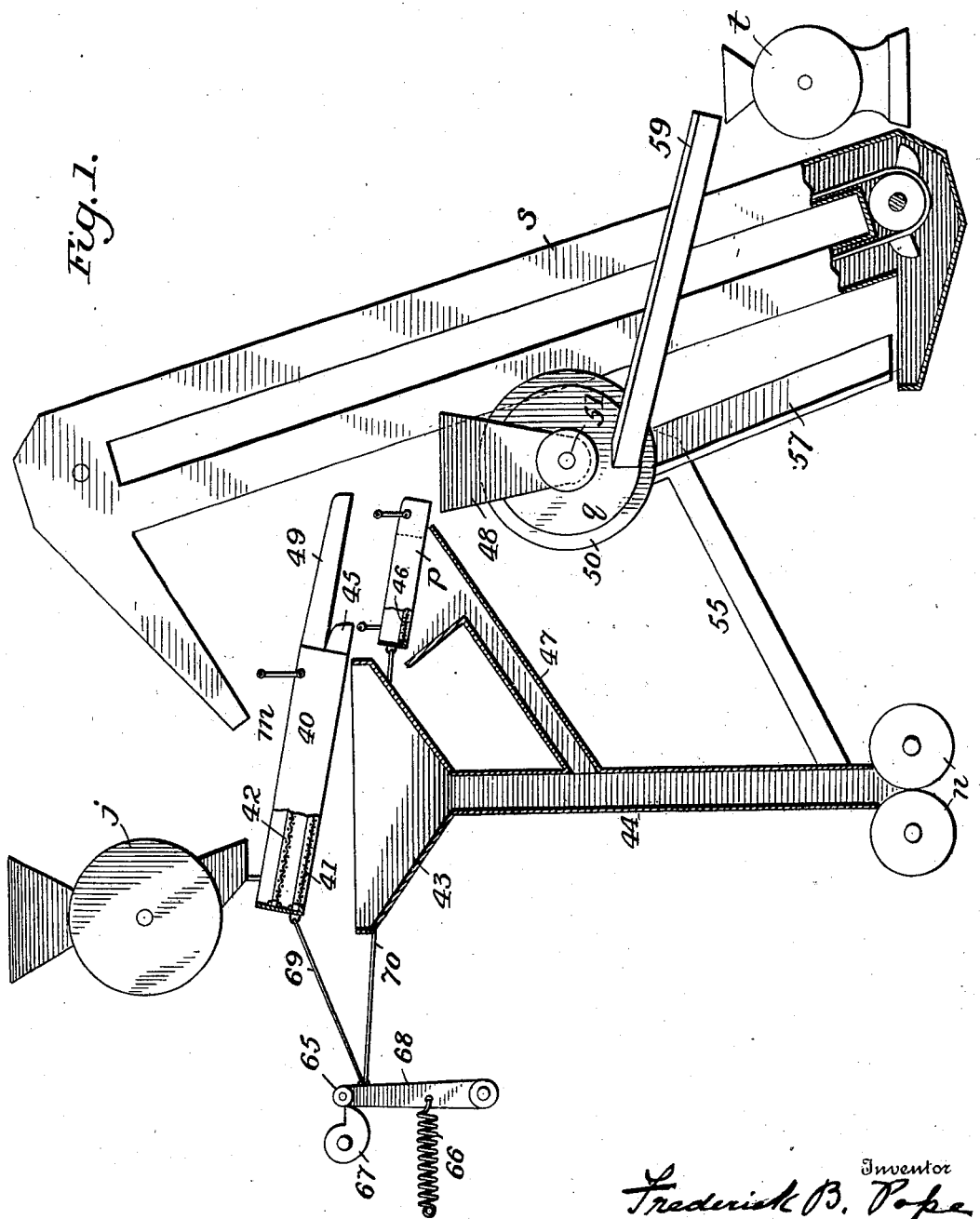
Figure 2:
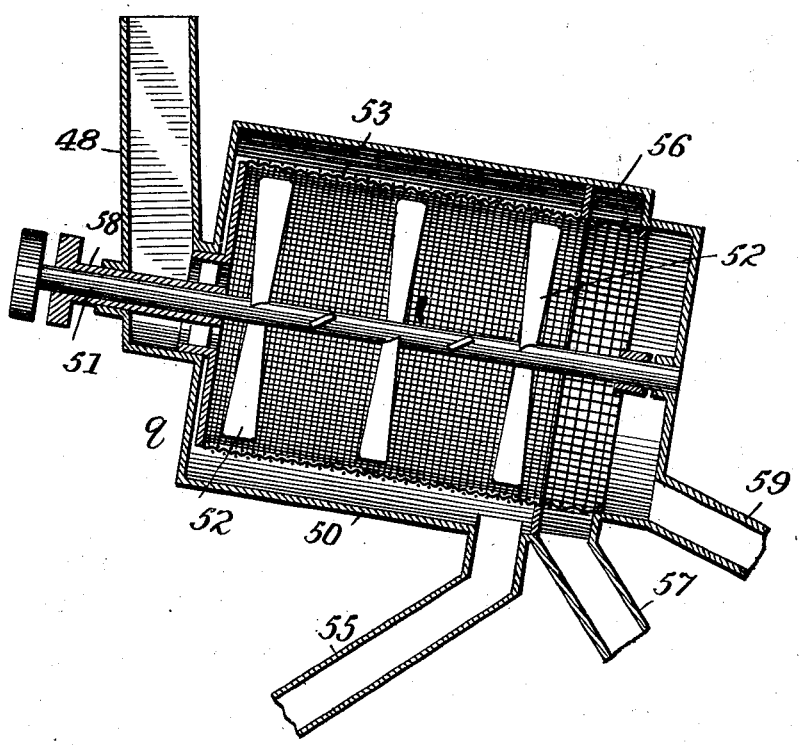
Figure 3:
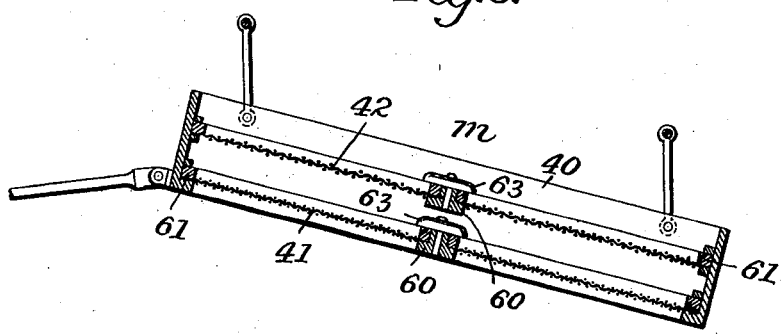

Figure 1 is an elevation of sufficient of an apparatus to illustrate my invention, details of no importance being omitted; Fig. 2, an enlarged section of the screener; Fig. 3, an enlarged section of the sifter.

The huller $j$ is of any suitable character to break up the seed and loosen the kernel from the hull portion, and the loosened particles pass from this huller onto a sifter $m$. As is well known, the hulls of cotton-seed are much tougher than the kernels, and while the latter may be easily broken into small fragments the hulls may not be so easily broken into small fragments, and even if so broken the fiber tends to hold the fragments together. Nevertheless there will be a small percentage of the hull in the form of small fragments practically free from fiber which will pass through the sifters with the kernel fragments. This small percentage of hull will not, however, be detrimental to the kernel-meal. This sifter may be differently constructed, but preferably is of such construction as to separate the material into different grades and also to violently agitate it, with a view of causing the major portion of the hulls to separate themselves from the kernels and small fragments of hull, and is therefore preferably constructed as a frame 40, having bearings for screens 41 42, the coarser screen 42, which at once carries off all the coarser particles above the finer screen 41, and below the finer screen 41 is a hopper 43, from which a chute 44 leads to the crushing-rolls $n$. A spout 45 conducts the material that does not pass through the finer screen 41 onto another screen-sifter $p$, having a screen 46, and it is there agitated and violently shaken, and any of the finer particles of kernel that escaped from the screen 41, but can pass through the screen 46, are conducted by a chute 47 also to the crushing-rolls, while the hulls and fibers from the sifter $p$ are discharged into a hopper 48 of the rotating screener $q$, and a spout 49 discharges into the same hopper the material that cannot pass through the coarser screen 42 of the sifter $m$. Any other suitable system of sifters may be used.

The screener $q$, as shown, consists of a stationary cylindrical casing 50, preferably inclined, with a central shaft 51, supporting a series of arms 52, and on the shaft 51 rotates a sleeve 58, carrying a perforated cylinder 53, having screen-openings of different sizes. A chute 55 passes from the bottom of the casing 50 to the chute 44, and a chute 57 extends from the lower head of the cylinder 53, so that the material which cannot pass through the cylinder 53 will pass from the end of the same to a chute 59, while the part too coarse to pass through the finer meshes, but capable of passing through the coarser meshes of the cylinder 53, will find its way by the chute 57 to the bottom of an elevator $s$. The elevator lifts and discharges the material into the sifter $m$, where it is again agitated and then discharged into the sifter $p$ and again agitated and again brought back to the screener $q$, by which repeated operations the more finely divided and heavier particles of kernal are disassociated from the hulls and fiber and conducted to the rollers $n$, while the hulls and fibers are discharged to the chute 59 and will pass to apparatus for reducing the same.

In the operation of the apparatus the hulls and fibers and adhering kernels passing to the central rotating screen are violently agitated by the blades of the beater therein, so that the kernels are broken up and separated from the larger pieces of hull and fiber which pass to the chute 59 and to the hull-comminuting apparatus, as a mill $t$.

As shown, there are pulleys on the shafts connected to the beaters and the rotary cylinder, so that they can be rotated rapidly, preferably in different directions.

In ordinary apparatus intended for sifting materials of this character the screens are nailed within the frames of the sifter, so that any change in the screens is attended with considerable inconvenience, delaying operations within the mill during the time that such change is made. To avoid this, I provide the frame 40 of the sifter with bearings 60 for detachable screen-frames 61, which are placed upon said bearings and then secured in place by merely turning any suitable securing devices 63 to position to hold them in place.

Any suitable means may be employed for agitating the sifters. As shown, a vibrating arm 68 is provided with a roller 65, which is drawn by a spring 66 against a rotating cam 67, having an abrupt shoulder, so that when the said shoulder passes the roller 65 the arm 68 will move back suddenly, and said arm is connected by rods 69 70 to the frames of the sifters. It will be evident, however, that any other suitable agitating devices may be employed.

Without limiting myself to the precise construction and arrangement of parts shown, I claim as my invention—

1. In an apparatus for separating kernels from hulls of cotton-seeds, the combination with means for cracking the seed, of a sifter $m$ having coarse and fine mesh screens 42, 41, a screener $p$ arranged to receive the tailings from the fine-mesh screen, a receiver for the kernels from the sifter $m$ and screener $p$, a screener $q$ having screens of different sizes arranged to receive the tailings from the screener $p$ and coarse screen 42, and an elevator for carrying the tailings from the screener $q$ to the sifter $m$, substantially as set forth.

2. In an apparatus for separating the kernels from the hulls of cotton-seed, the combination with means for cracking the seed, of a coarse-mesh screen 42 onto which the cracked seed is delivered, a finer-mesh screen 41 below the screen 42, a receiver for the kernel which passes through the screen 41, a fine-mesh screen 46 onto which the tailings from the screen 41 are delivered, a receiver for the kernel passing through the screen 46, a screener having screen-openings of different size, into which the tailings from the screen 46 and the screen 42 are delivered, a receiver for the kernel which passes through the finer meshes of the said screener, and an elevator for returning the material passing through the coarse meshes of the screener to the screen 42, substantially as set forth.

3. In an apparatus for separating the kernels from the hulls of cotton-seed, the combination with means for cracking the seed, of a coarse-mesh screen 42 onto which the cracked seed is delivered, a finer-mesh screen 41 below the screen 42, a receiver for the kernel which passes through the screen 41, a fine-mesh screen 46 onto which the tailings from the screen 41 are delivered, a receiver for the kernel passing through the screen 41, a screener having screen-openings of different size, into which the tailings from the screen 46 and the screen 42 are delivered, a receiver for the kernel which passes through the finer meshes of the said screener, and an elevator for returning the material passing through the coarse meshes of the screener to the screen 42, and crushing-rolls for the kernel to which the respective receivers lead, substantially as set forth.

In testimony whereof I have signed my name to this specification in the presence of two subscribing witnesses.

FREDERICK B. POPE.

Witnesses:
H. M. GILLMAN, Jr.,
J. J. McCARTHY.